United States Patent

[11] 3,593,030

[72] Inventor Jorg Jaskowsky
Ruit Wurttemberg, Germany
[21] Appl. No. 854,182
[22] Filed Aug. 29, 1969
[45] Patented July 13, 1971
[73] Assignee Eastman Kodak Company
Rochester, N.Y.
[32] Priority Sept. 5, 1968
[33] Germany
[31] P 17 74 783.0

[54] INFORMATION BEARING CARD AND APPARATUS FOR SENSING DATA THEREON
10 Claims, 5 Drawing Figs.

[52] U.S. Cl. .......... 250/219 DC, 235/61.11 E, 250/220 R, 250/239
[51] Int. Cl. .......... G01n 21/30, G06k 7/00, H01j 5/02
[50] Field of Search .......... 250/219, 239, 220, 220 MX; 235/61.115

[56] References Cited
UNITED STATES PATENTS
3,402,999 9/1968 Held .......... 250/219

*Primary Examiner*—James W. Lawrence
*Assistant Examiner*—T. N. Grigsby
*Attorneys*—Robert W. Hampton and R. Lewis Gable

ABSTRACT: An information bearing card is disclosed as having information fields disposed on both sides of the card and further having indicia of a contrasting type disposed on each of the fields. In addition, apparatus is provided for scanning both sides of the card at the same time and may illustratively take the form of a matrix of photoconductive elements sensitive to radiation reflected from the card and having transmissive portions disposed between the radiation sensitive elements to allow radiation to be directed therethrough and onto the information bearing card.

JÖRG JASKOWSKY
*INVENTOR.*

BY R. Lewis Gable
Robert W Hampton
ATTORNEYS

JÖRG JASKOWSKY
INVENTOR.

BY R. Lewis Gable
Robert W Hampton
ATTORNEYS

INFORMATION BEARING CARD AND APPARATUS FOR SENSING DATA THEREON

BACKGROUND OF THE INVENTION

1. Field of the Invention

This invention relates to information bearing cards and to apparatus for sensing information disposed thereon.

2. Description of the Prior Art

Information bearing cards, and in particular, aperture cards are well known in the art in a form having apertures or openings disposed in a pattern which may be sensed mechanically to derive the digital data or information carried by the card. Such cards have gained wide acceptance in the computer and data handling field. In addition, information bearing cards have been provided with portions thereof having printed analog data stored thereon. Typically, one side of the card is provided with a background of the first contrast, i.e., a bright or white background, upon which there is disposed markings or indicia of a contrasting appearance. Such indicia is adapted to be read out photoelectrically or thermal electrically. However, it is noted that the readout is typically performed by directing a source of radiation through the card to be sensed by suitable detectors disposed on the opposite side of the card from the source of radiation. Such readout is made by transillumination and makes use of the semitransparency of the material of which the card is made.

In contrast with the information card having openings punched therethrough, the film carrying aperture cards have the disadvantage that the storage capacity for digital information is reduced. The area required for the mounting of the film chip is no longer available to be coded with openings disposed therethrough.

It is therefore an object of this invention to substantially increase the digital storage capacity of an information bearing card such as an aperture card.

SUMMARY OF THE INVENTION

These and other objects are accomplished in accordance with the teachings of this invention by providing an information bearing card such as an aperture card having a field thereon of a first density or shade disposed on both sides of the card with indicia of a second, contrasting density disposed selectively on both of the fields. Such a card is particularly designed to be read out by apparatus disposed on both sides of the information bearing card. In one particular embodiment of this invention, apparatus may take the form of a matrix of radiation sensitive elements, which matrix is disposed to sense radiation reflected from the surface of the information bearing card. Illustratively, the matrix could take the form of a plurality of radiation sensitive elements such as diodes between which are disposed radiation transmissive areas to allow radiation from an appropriate source to be directed therethrough and onto the card.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
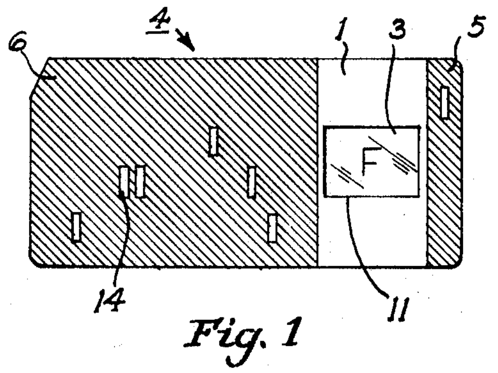
FIGS. 1 and 2 show side views of opposite sides of an information bearing card in accordance with the teachings of this invention.
Figure 2:
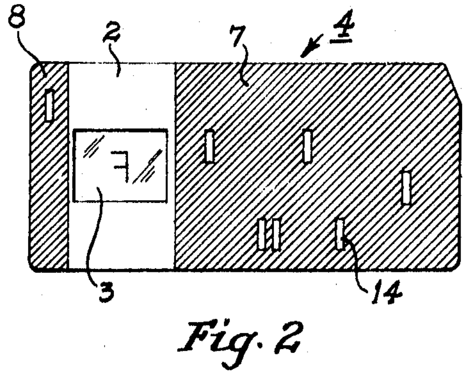

Referring now to FIG. 1, there is shown an information bearing or aperture card 4 having an aperture 11 therein for receiving an information bearing medium 3 such as a chip of film. As is well understood in the art, the medium 3 may contain an image photographically reproduced thereon. The aperture card 4 has first and second sides 1 and 2 as shown respectively in FIGS. 1 and 2. Side 1 has at least a pair of fields 5 and 6 of a first contrast with suitable coding indicia 14 imprinted or suitably disposed thereon. In a similar fashion, side 2 has a pair of fields 7 and 8 with coding indicia 14 of an opposite contrast disposed thereon. As illustratively shown in FIGS. 1 and 2, the fields 5, 6, 7 and 8 are of a dark contrast whereas the coding indicia 14 are of an opposite or light contrast. It may be understood that the indicia may be of a dark or black contrast disposed upon a light background or field.

Thus, the coding could be effected in either a positive or negative form. For example, information 100001000001 can be recorded by the following series of coded indicia: light, four times dark, light, five times dark, light; or by dark, four times light, dark, five times light, dark. In the first example, there is provided a dark background upon which light indicia will be disposed, and in the second example, a light background or field will be chosen upon which there would be imprinted or disposed dark indicia. In the reading or detecting device to be explained later in detail, a sensing or triggering mechanism may be designed to sense either positive or negative forms of indicia.

Illustratively, both direct and indirect photographic or thermographic methods may be used to produce the bright-dark fields or patterns on sides 1 and 2 of the information bearing card 4. For example, either side of the information bearing card 4 may be coded with radiation sensitive or heat sensitive layers which are well known in the art. In particular, layers such as those known in diazo photography or photochromic layers may be employed to coat both sides of the card 4. Such layers are advantageous in that they do not require any wetting or excessive heating of the card which may be moisture or temperature sensitive. In addition, indirect methods such as dye transfer from light sensitive or heat sensitive matrixes may be used to provide the background or field upon which the coding indicia 14 are placed. It may also be possible to use other well-known printing, stamping or dyeing methods to produce the bright-dark fields. Dyeing, for instance, might be used by means of a simple stencil, e.g. a screen printing stencil, which preferably is provided with mechanically or electromagnetically displacable fields to adjust the coding.

In some instances, it may not be desired to provide an aperture 11 with an information bearing medium 3 disposed therein. Rather, an optical character translation of the digital code formed by the coding indicia 14 or other analog information may be applied to this area of the card simultaneously with the bright-dark fields. The patterns of coding indicia 14 may be possibly related to or coded to identify the information disposed upon this intermediate area. In addition, the aperture 3 may be replaced by another information bearing medium, such as a paper photograph or a printing stencil for addresses.

Figure 3:
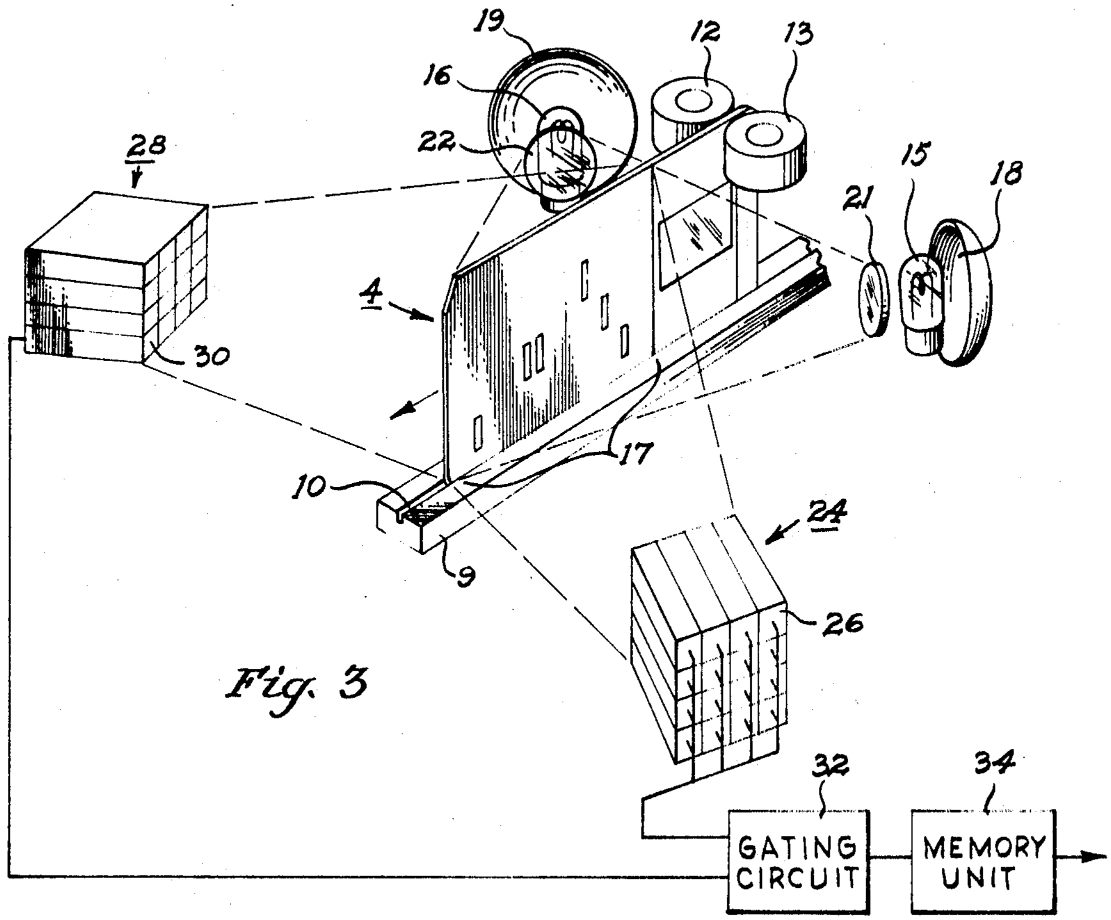
FIG. 3 is a pictorial view showing apparatus for sensing the information disposed on the information bearing card shown in FIGS. 1 and 2.

With reference to FIG. 3, the information placed upon the card 4 may be read out or otherwise be retrieved by directing radiation onto both sides 1 and 2 of the card 4 and of sensing reflected radiation therefrom to produce electrical signals corresponding to the pattern(s) of coding disposed on the card 4. In comparison to those information bearing cards where information is punched into the cards, the information bearing card 4 provides approximately twice the storage capacity for digital data or information, since both sides of the card can be optically (or thermally) sensed simultaneously or successively. More specifically, the information bearing card 4 may be moved along a groove 10 disposed within a guide member 9 by a pair of drive rollers 12 and 13 which may be rotated by a selectively operable mechanism (not shown) to bring the card 4 to a reading or information retrieval station 17. When the information bearing card 4 has been disposed at the information retrieval station 17, radiation is directed onto both sides 1 and 2 of the information bearing card 4 from a pair of sources 15 and 16 of radiation. More specifically, the source 15 of radiation emits radiation of a preselected wavelength which is reflected and focused respectively by reflector 18 and a lens assembly 21 onto that portion of the card 4 from which information is to be derived. In a similar manner, the radiation derived from the source 16 is reflected and focused respectively by reflector 19 and lens assembly 22 onto the code bearing portion of the other side of card 4. As shown in FIG. 3, a first array 24 of radiation sensors 26 and a second array 28 of radiation sensors 30 are disposed respectively on either side of the information bearing card 4 to detect or sense the radiation reflected therefrom. The first and second arrays 24 and 28 are made of a plurality of the radiation sensors 26 and 30, respectively, disposed to detect radiation derived from substantially the entire portion of the card 4 bearing the pattern of coding indicia 14.

In contrast to the methods of the prior art, the reflected radiation is sensed by an array of radiation detectors whose sensitivity is adjusted to the radiation of the wavelength directed thereon to detect the light-dark coating on both sides 1 and 2 of the card 4. Sides 1 and 2 of the card 4 may be optically read simultaneously or successively. In the latter case, the electrical signals derived from the arrays 24 and 28 may be fed to a gating circuit 32 which serves to apply first the electrical signals from one array to a memory unit 34 and then apply the electrical signals derived from the other array of radiation sensors. The memory unit 34 serves to record and store the electrical signals derived from one side of the card 4 while the other electrical signals are being utilized. In another possible mode of operation, the memory unit 34 may serve to sequentially record the information derived from one array first and then record and store the information derived from the other array, which combined sets of information may be repeatedly read off or displayed.

Figure 4:
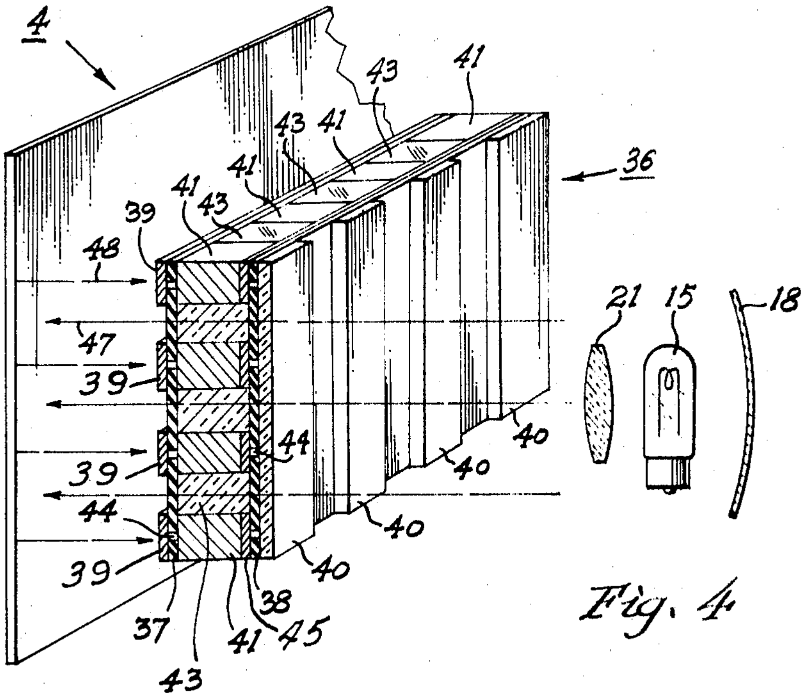
FIGS. 4 and 5 show oblique views of matrixes of radiation sensitive devices designed to sense the information stored on the information bearing card of FIGS. 1 and 2.

Referring now to FIG. 4, a radiation matrix 36 is disposed between the source 15 of radiation and the information bearing card 4. In a manner similar to that described above, the radiation derived from the source 15 is reflected and focused respectively by the reflector 18 and the lens assembly 21 along paths 47 through the matrix 36 to be reflected from card 4 along paths 48 to the matrix 36. More specifically, the matrix 36 is made up of a plurality of regions 41 which are sensitive to radiation of the wavelength emitted by the source 15 to thereby change the impedance, e.g. resistance, of the material which the regions 41 are made. The regions 41 are interdisposed between the regions 43 which are transmissive to radiation of the wavelength emitted by the source 15. As shown in FIG. 4, the regions 41 and 43 are disposed between a pair of layers 37 and 38 made of a suitable insulating material. A pair of sets of conductors 39 and 40 are disposed respectively on the insulating layers 37 and 38 to thereby provide an electrical circuit through the regions 41. More particularly, the conductors 39 are disposed on the layers 37 of electrical insulating material along the horizontal or X axis whereas the conductors 40 are disposed generally vertically or along the Y axis. Further, a plurality of contacts 44 are disposed within openings through the insulating layer 37 to make electrical contact between the conductors 39 and the region 41, and are disposed within openings through the insulating layer 38 to make electrical contact between the conductors 40 and the regions 41. A plurality of screens 45 or layers of a material opaque to the radiation emitted by the source 15 are disposed between the regions 41 and the layer 38 to prevent unreflected radiation from the source 15 from being sensed by the regions 41. Instead, the radiation is directed along paths 47 through the transmissive regions 43 to be reflected from the card 4 along paths 48 to be sensed by the regions 41. It is noted that the insulating layers 37 and 38 and the conductors 39 and 40 are made of materials or deposited to such thicknesses to be transmissive to the radiation emitted from the source 15. In operation, a potential may be sequentially placed across each of the sensitive regions 41 to sense the change of the impedance thereof and to thereby obtain a measure of the radiation reflected from the surface or side of the card 4. Switching circuits are well known in the art for applying sequentially a potential through X, Y conductors 39 and 40.

Figure 5:
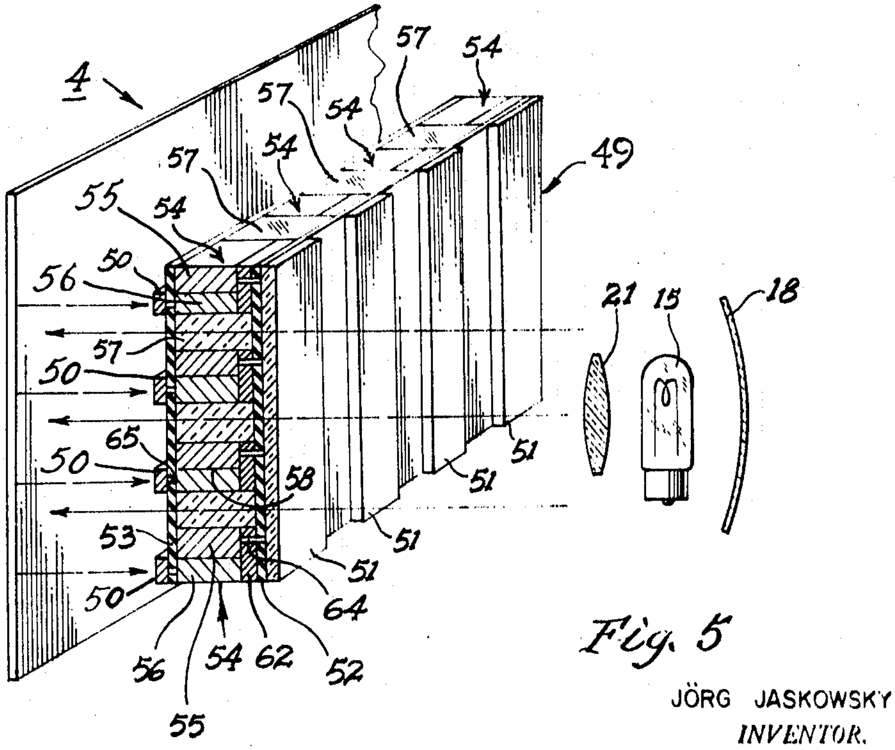

With reference now to FIG. 5, there is shown a radiation sensitive matrix 49 similar to that shown in FIG. 4 which matrix 49, in contrast, includes a plurality of radiation sensitive diodes 54. More particularly, the radiation sensitive diodes are made up of regions 55 and 56 of opposite type conductivities. Junctions 58 are formed between the regions 55 and 56 and present an impedance which is effected by the incident radiation reflected from the surface of the information bearing card 4. A plurality of transmissive regions 57 made of a material transmissive to the radiation emitted by source 15 are disposed between the radiation sensitive diodes 54 to allow the radiation directed toward the card 4 to pass through the radiation matrix 49. As shown in cross section in FIG. 5, a pair of layers 52 and 53 of an insulating material are disposed on either side of the transmissive regions 57 and the radiation sensitive diodes 54. First and second sets of conductors 50 and 51 are disposed respectively on the layers 53 and 52 of insulating material. More specifically, the electrical conductors 50 are disposed substantially horizontally or along the X axis, and the conductors 51 are disposed generally vertically or along the Y axis. A plurality of contacts 65 are disposed within openings through the layer 53 to electrically connect the conductors 50 to the regions 56 of the radiation sensitive diodes 54. In a similar manner, a plurality of contacts 64 are disposed within openings through the layer 52 of insulating material to electrically connect the conductors 51 to the regions 55 of the radiation sensitive diodes 54. A plurality of layers or screens 62 of a material opaque to the radiation emitted by the source 15 are disposed between the radiation sensitive diodes 54 and the layer 52 of insulating material to prevent radiation from being directly emitted onto the radiation sensitive diodes 54. Thus, in operation, radiation is emitted from source 15, is focused through the transmissive regions 57 of the radiation sensitive matrix 49 to be reflected from the information bearing card 4 back onto the radiation sensitive diodes 54. It is understood that the layers 52 and 53 of electrically insulating material and the conductors 50 and 51 are made of a suitable material or are disposed to such a thickness so as to be transmissive to the radiation emitted by the source 15. The reflected radiation is directed onto the junctions 58 formed between the regions 55 and 56 of opposite conductivity to thereby effect the impedance across the junctions 58. Thus, as a potential or suitable electrical signal is sequentially applied by the conductors 50 and 51 across each of the radiation sensitive diodes 54, an electrical signal is derived indicative of the change of impedance across the junction 58 and also of the radiation reflected from the surfaces of the card 4. It may be understood that a similar matrix 49 may be disposed on the other side of the card 4.

The radiation sensitive matrixes and arrays provide electrical signals indicative of the coding indicia 14 disposed upon the cards 4, which signals may be used in retrieval systems to indicate the information contained upon the information bearing medium 3. Thus, a retrieval system could be programmed to detect a certain card and to extract the card from a plurality of similar cards based upon the pattern of indicia disposed thereon. In addition, the electrical signals could be used to produce the same coding on a second card, either photographically or by means of a printing device such as automatic typewriter having type corresponding to the coding field.

The invention has been described with particular reference to preferred embodiments thereof, but it will be understood that variations and modifications can be effected within the spirit and scope of the invention.

I claim:

1. Apparatus for sensing information on an information bearing card having at least a first side, a field of a first type disposed on the first side and indicia of a second type contrasting with the first type disposed on the field in a coded pattern, said apparatus comprising:

a. a radiation sensitive matrix including first regions transmissive to radiation of a given wavelength and second regions sensitive to the radiation of the given wavelength to provide a manifestation of the coded pattern, and
b. radiation emitting means disposed for directing the radiation of the given wavelength through said transmissive regions onto the card.

2. Apparatus as claimed in claim 1, wherein said first and second regions are interdisposed between each other.

3. Apparatus as claimed in claim 1, wherein said second regions include a first semiconductive portion of a first type and a second semiconductive portion of a second type opposite to said first type.

4. Apparatus as claimed in claim 1, wherein layers made of a material opaque to the radiation are disposed between said second regions and said radiation emitting means to prevent radiation from being directly emitted from said emitting means onto said second regions.

5. Apparatus for sensing information on an information bearing card having first and second sides, first and second fields of a first type disposed respectively on said first and second sides, and indicia marks of a second type contrasting with said first type disposed on said first and second fields in a coded pattern, said apparatus comprising:
a. first and second emitting means for directing radiation respectively onto the first and second sides of the information bearing card; and
b. first and second radiation sensing means including:
   1. transmissive regions made up of material transmissive to the radiation emitted by said first and second emitting means, and
   2. radiation sensitive regions disposed to receive the radiation reflected from the card and made of a material sensitive to the radiation; said first and second radiation sensing means disposed to receive the reflected radiation respectively from the first and second sides of the information bearing card and for providing respectively manifestations of the coded pattern of the indicia marks.

6. Apparatus as claimed in claim 5, wherein there is included means for storing the manifestations derived from at least one of said first and second radiation sensing means.

7. Apparatus as claimed in claim 5, wherein said transmissive regions and said radiation sensitive regions of at least one of said first and second radiation sensing means are disposed in a matrix, said transmissive regions being disposed between said radiation sensitive regions.

8. Apparatus as claimed in claim 7, wherein said radiation sensitive matrix is disposed between one of said first and second emitting means and the information bearing card.

9. Apparatus for sensing information on an information bearing medium having first and second sides, first and second fields of a first reflectivity located respectively on the first and second sides, and indicia marks of a second contrasting reflectivity disposed on the first and second fields in a coded pattern, said apparatus comprising:
a. first and second means for emitting and directing radiation onto the first and second sides, respectively, of the information bearing medium; and
b. first and second radiation sensing means for receiving radiation reflected from the first and second sides, respectively, of the information bearing medium and for providing manifestations of the coded pattern of indicia marks on the first and second sides, said first and second radiation sensing means respectively located between said first and second emitting means and the respective first and second sides of the information bearing medium;
c. said first and second radiation sensing means including means for permitting radiation transmission from said first and second emitting means, respectively, to the respective first and second sides of the information bearing medium.

10. Apparatus for sensing information from an information bearing medium comprising:
a. radiation transmissive elements;
b. means for emitting and directing radiation to the information bearing medium; and
c. radiation sensing elements for sensing radiation reflected from the information bearing medium and for providing a manifestation of the reflected radiation, said radiation sensing elements being integrally interspersed with said radiation transmissive elements;
d. said radiation sensing and transmissive elements being positionable between said radiation emitting means and the information bearing medium whereby radiation from said emitting means is transmitted through said transmissive elements to the information bearing medium, and radiation reflected from the information bearing medium is received and sensed by said sensing elements.